US010168597B2

(12) United States Patent
Frantz et al.

(10) Patent No.: US 10,168,597 B2
(45) Date of Patent: Jan. 1, 2019

(54) LIQUID CRYSTAL ALIGNMENT ON CHALCOGENIDE GLASSES

(71) Applicant: The United States of America, as represented by the Secretary of the Navy, Washington, DC (US)

(72) Inventors: Jesse A. Frantz, Washington, DC (US); Jason D. Myers, Alexandria, VA (US); Christopher M. Spillmann, Annandale, VA (US); Jawad Naciri, Arlington, VA (US); Banahalli R. Ratna, Alexandria, VA (US); Leslie Brandon Shaw, Woodbridge, VA (US); Jasbinder S. Sanghera, Ashburn, VA (US); Robel Y. Bekele, Washington, DC (US); Jakub Kolacz, Alexandria, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/652,604

(22) Filed: Jul. 18, 2017

(65) Prior Publication Data

US 2018/0024413 A1     Jan. 25, 2018

Related U.S. Application Data

(60) Provisional application No. 62/363,939, filed on Jul. 19, 2016.

(51) Int. Cl.
*G02F 1/1337* (2006.01)
*G02F 1/313* (2006.01)
*G02F 1/13* (2006.01)

(52) U.S. Cl.
CPC .......... *G02F 1/313* (2013.01); *G02F 1/13378* (2013.01); *G02F 1/133784* (2013.01); *G02F 1/1303* (2013.01); *G02F 2201/12* (2013.01); *G02F 2202/09* (2013.01)

(58) Field of Classification Search
CPC . G02F 1/313; G02F 1/13378; G02F 1/133784
USPC ....................................................... 349/123
See application file for complete search history.

(56) References Cited

U.S. PATENT DOCUMENTS

| | | | | |
|---|---|---|---|---|
| 4,092,060 | A * | 5/1978 | Nunoshita | G02F 1/335 385/16 |
| 4,799,125 | A * | 1/1989 | Crofts | H02H 9/048 361/111 |
| 5,467,204 | A * | 11/1995 | Hatano | G02F 1/1326 348/294 |

(Continued)

OTHER PUBLICATIONS

Kahn et al., "Surface-Produced Alignment of Liquid Crystals," Proc. IEEE, 61, 823-828 (1973).

(Continued)

*Primary Examiner* — Lucy P Chien
(74) *Attorney, Agent, or Firm* — US Naval Research Laboratory; Rebecca L. Forman

(57) ABSTRACT

A method for achieving alignment and optical switching of a liquid crystal (LC) layer that is deposited on chalcogenide glass (ChG). Direct brushing of ChG produces an effective LC alignment layer. Also disclosed is the related waveguide assembly for achieving alignment and optical switching of a liquid crystal (LC) layer deposited on chalcogenide glass (ChG).

9 Claims, 6 Drawing Sheets

(56) References Cited

U.S. PATENT DOCUMENTS

| | | | |
|---|---|---|---|
| 6,208,402 B1 * | 3/2001 | Tajima | G02F 1/13394 |
| | | | 349/156 |
| 6,304,306 B1 | 10/2001 | Shiomi et al. | |
| 2004/0137168 A1 * | 7/2004 | Fuflyigin | C03B 37/0183 |
| | | | 427/571 |
| 2012/0269478 A1 | 10/2012 | Anderson et al. | |
| 2015/0378242 A1 | 12/2015 | Auxier et al. | |

OTHER PUBLICATIONS

Schadt et al., "Surface-Induced Parallel Alignment of Liquid Crystals by Linearly Polymerized Photopolymers," Jpn. J. Appl. Phys., 31, 2155-2164 (1992).

Chae et al., "Surface Morphology, Molecular Reorientation, and Liquid Crystal Alignment Properties of Rubbed Nanofilms of a Well-Defined Brush Polyimide with a Fully Rodlike Backbone," Macromolecules, 35, 10119-10130 (2002).

Zakery et al., "Optical properties and applications of chalcogenide glasses: a review," J. Non-Cryst. Solids, 330, 1-12 (2003).

\* cited by examiner

LIQUID CRYSTAL ALIGNMENT ON CHALCOGENIDE GLASSES

PRIORITY CLAIM

The present application is a non-provisional application claiming the benefit of U.S. Provisional Application No. 62/363,939, filed on Jul. 19, 2016 by Jesse A. Frantz et al., entitled "LIQUID CRYSTAL ALIGNMENT ON CHALCOGENIDE GLASS." The provisional application and all publications and patent documents referred to throughout this nonprovisional application are incorporated herein by reference in their entirety.

BACKGROUND OF THE INVENTION

Field of the Invention

The present invention relates to methods for achieving alignment and optical switching of a liquid crystal (LC) layer that is deposited on chalcogenide glass (ChG). It also includes a new product comprising a ChG substrate or film and an aligned LC layer.

Description of the Prior Art

The use of LCs has become commonplace for a variety of applications, ranging from display technology to electro-optical devices such as tunable filters. Recently, a new application has been developed in which LCs are used to steer an optical beam. (Anderson et al., "Liquid crystal waveguide for dynamically controlling polarized light," U.S. Patent Publication 2012/0269478 (Oct. 25, 2012) and Auxier et al., "Non-mechanical beam steering tracking system," U.S. Patent Publication 2015/0378242 (Dec. 31, 2015)). Since no mechanical motion is required, this process is referred to as "non-mechanical beam steering" (NMBS). NMBS is appealing as a replacement for traditional beam steering mechanisms which rely on mechanical devices such as gimbals. In comparison to mechanical beam steering, NMBS offers the potential for significant reductions in size, weight, and power (SWaP). Furthermore, the lack of moving parts results in reduced maintenance requirements and thus lower cost for NMBS systems.

As described in U.S. Patent Publication 2012/0269478, an assembly including an optical waveguide, an LC layer, and electrodes—referred to from hereon as the "waveguide assembly"—may be created in which light travels in a planar optical waveguide with high transparency in the wavelength range of interest, and some fraction of the optical mode overlaps with an LC layer. By varying a voltage applied to electrodes in proximity to the LC layer, the refractive index of the LC may be changed, and thus the effective refractive index of the optical mode travelling in the waveguide may be varied. Changing the mode's effective index permits steering the direction of a polarized optical beam.

In order for the refractive index of the LC layer to be varied with voltage, the molecules within the LC must be aligned. Methods of aligning the LC are well known from prior work. These include mechanically rubbing a polymer surface or depositing a thin textured film. (Kahn et al., "Surface-produced alignment of liquid crystals," Proc. IEEE 61, 823-828 (1973); Schadt et al., "Surface-Induced Parallel Alignment of Liquid Crystals by Linearly Polymerized Photopolymers," Jpn. J. Appl. Phys. 31, 2155-2164 (1992); and Shiomi et al., "Liquid crystal display device and method for producing the same," U.S. Pat. No. 6,304,306 (Oct. 16, 2001)). In the most common method of aligning the LC, a polyimide (PI) film is deposited proximate to both the bottom and top electrodes, and the PI layers are rubbed with a piece of cellulose fabric, producing a surface texture that causes the LC molecules to align. (Chae et al., "Surface Morphology, Molecular Reorientation, and Liquid Crystal Alignment Properties of Rubbed Nanofilms of a Well-Defined Brush Polyimide with a Fully Rodlike Backbone," Macromolecules 35, 10119-10130 (2002)).

Most work on NMBS systems has focused on visible through short wave infrared (SWIR) wavelengths. However, a number of applications of NMBS exist further into the infrared, in the mid-wave infrared (MWIR)—2-5 µm wavelength range, and the long-wave infrared (LWIR)—5-15 µm wavelength range. In these cases, the components of the waveguide assembly must be made to transmit in the wavelength range of interest. These components include the waveguide, the LC, and the alignment layer.

One set of appealing materials for the waveguide is chalcogenide glasses (ChGs). These glasses are amorphous semiconductors that contain as a major constituent one or more of the "chalcogen" elements from group 6a of the periodic table (sulfur, selenium and tellurium), covalently bonded to network formers, such as As, Ge, Sb, Ga, etc. (Zakery et al., "Optical properties and applications of chalcogenide glasses: a review," J. Non-Cryst. Solids 330, 1-12 (2003)). They have low phonon energy in comparison to most common optical materials and can thus have transmission extending through the MWIR and LWIR.

In the refractive approach to NMBS, where light traverses the waveguide assembly, it is critical to minimize absorption losses from the various layers. This can be accomplished by minimizing the number of layers as well as incorporating layers that consist of materials with low absorption coefficients. Since LC must be aligned to utilize its benefit, an ideal solution is to align the LC directly on the substrate of interest without adding an additional alignment layer where unwanted absorption, scattering, or ionic impurities could be introduced in application relevant bands of the infrared spectrum. Absorption and scattering losses in the waveguide assembly will degrade light throughput, and ionic impurities will partially screen the applied voltage. The latter will require higher, yet unwanted, driving voltages to realign the LC and redirect the beam. A PI alignment layer is not adequate for this application because it introduces an additional layer to the waveguide assembly with unwanted ionic impurities and contributes to absorption losses in the MWIR. The present invention teaches how a chalcogenide film can be rubbed directly, without depositing another film for an alignment layer, producing a textured surface that serves as an LC alignment layer.

BRIEF SUMMARY OF THE INVENTION

The present invention provides a method for achieving alignment and optical switching of a liquid crystal (LC) layer that is deposited on chalcogenide glass (ChG). Direct brushing of ChG produces an effective LC alignment layer. The present invention also includes a waveguide assembly for achieving alignment and optical switching of a liquid crystal (LC) layer deposited on chalcogenide glass (ChG).

Several advantages are provided by the present invention. It provides a method for forming an LC alignment layer in a set of materials previously unknown to be suitable for this application. Also, it enables extension of NMBS into the MWIR and LWIR because it does not require deposition of additional layers that introduce ionic impurities or absorb in the wavelength range of interest. Moreover, it offers a lower cost alternative to existing technologies because it does not require additional deposition steps or vacuum processing.

These and other features and advantages of the invention, as well as the invention itself, will become better understood by reference to the following detailed description, appended claims, and accompanying drawings.

DETAILED DESCRIPTION OF THE INVENTION

Figure 1:
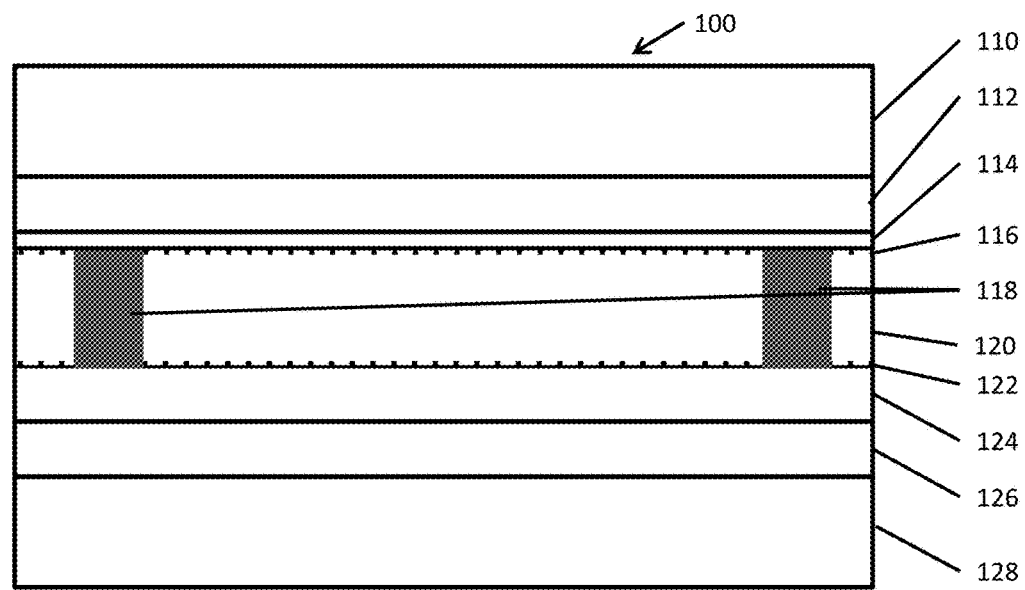
FIG. 1 is a schematic diagram of a preferred embodiment of the waveguide assembly.
Figure 2:
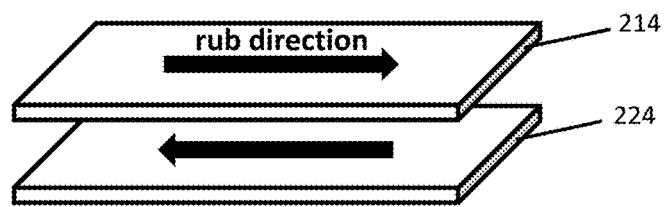
FIG. 2 is a schematic diagram showing anti-parallel configuration of rub directions for the ChG films.

In one embodiment of the invention, shown in FIG. 1, the waveguide assembly 100 comprises the following: a substrate 128; a bottom electrode 126 comprising a coating on the substrate that is an electrically conductive film that may be a transparent conductor such as indium tin oxide (ITO); a ChG waveguide 124 that is thick enough to support at least one optical mode and may be 0.1-10 μm thick; a brushed surface 122 on the ChG glass waveguide that may be produced by rubbing the ChG waveguide with a nylon brush one or multiple times; a superstrate 110; a top electrode 112 comprising a coating on the superstrate that is an electrically conductive film that may be a transparent conductor such as indium tin oxide (ITO); a thin ChG film 114 that is thin enough so that it does not support an optical mode and may be 0.01-0.2 μm thick; a brushed surface 116 on the thin ChG film that may be produced by rubbing the ChG glass waveguide with a nylon brush one or multiple times; spacers 118 to hold the superstrate and the films that coat it a fixed distance from the substrate and the films that coat it at a fixed separation; and an LC layer 120 filling the spacing between the superstrate 110 and the films that coat it and the substrate 128 and the films that coat it. The ChG waveguide and the thin ChG film may be aligned in anti-parallel configuration, as illustrated in FIG. 2. In this case, the rub direction for the thin ChG film 214 is aligned to be parallel to and opposite in direction for that of the ChG waveguide 224.

Figure 3:
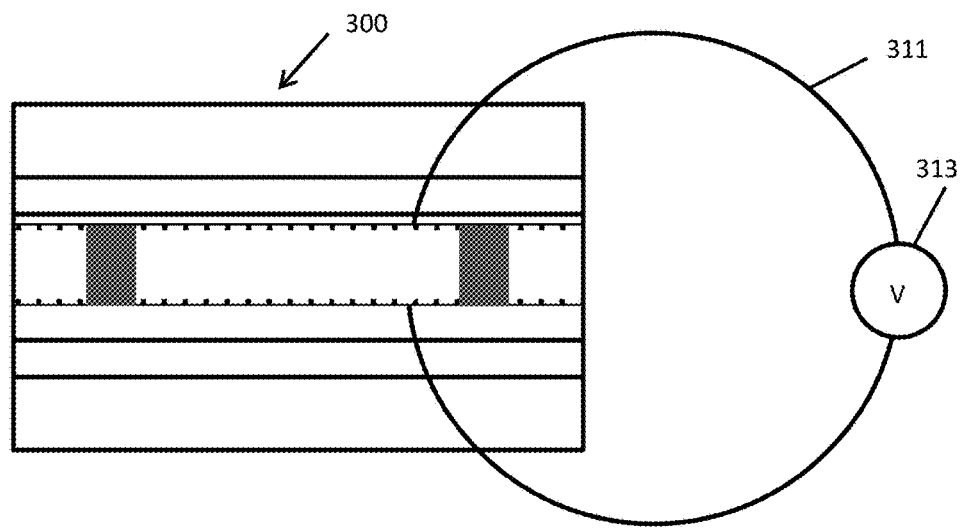
FIG. 3 is a schematic diagram showing application of a voltage between the electrodes.
Figure 4:
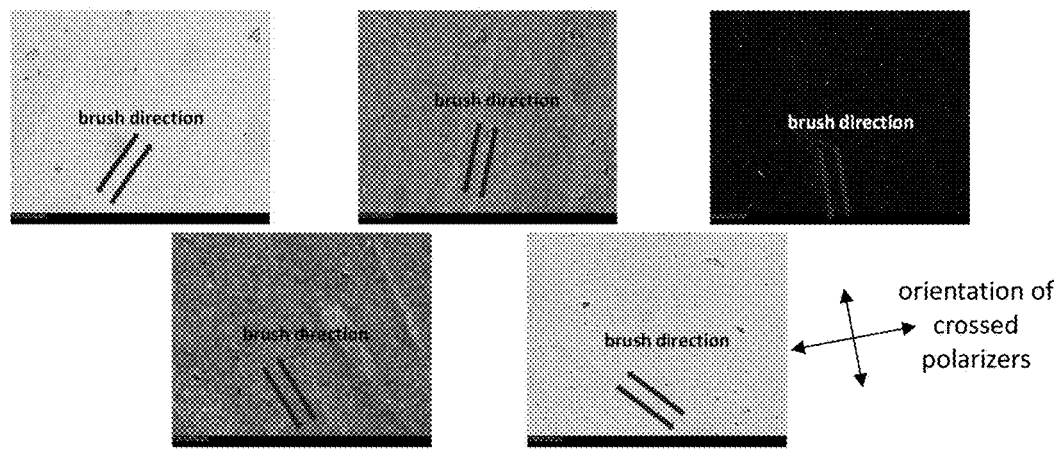
FIG. 4 shows images of a sample of LC on nylon brushed $As_2S_3$ as it is rotated with respect to crossed polarizers.
Figure 5A:
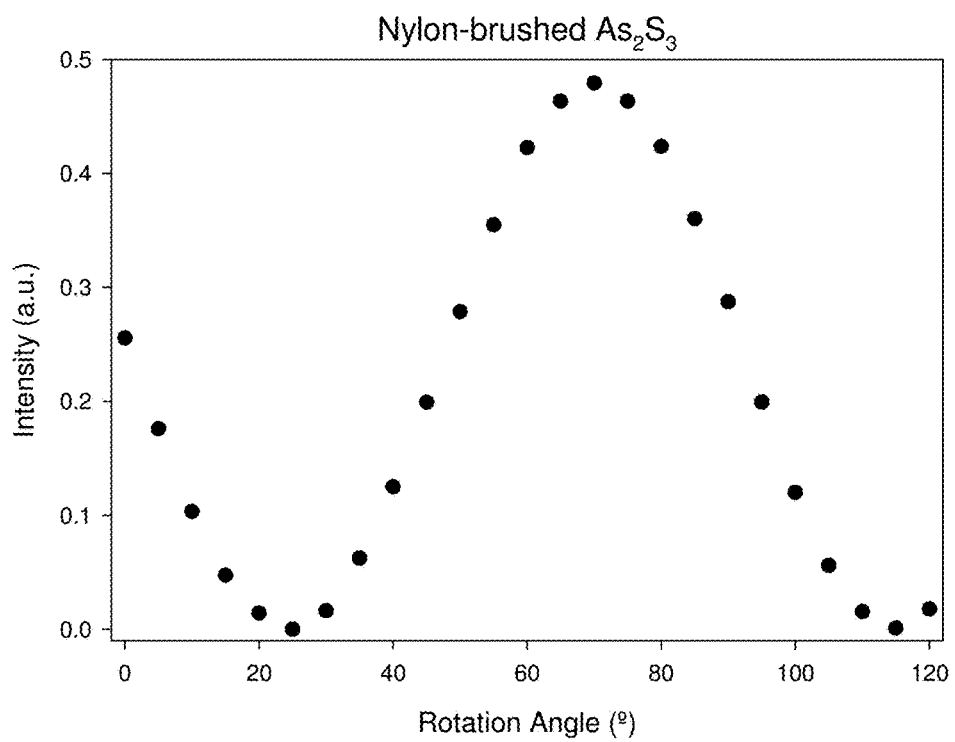
FIG. 5A is a plot of intensity change with respect to angle as a sample of LC on nylon brushed $As_2S_3$ is rotated with respect to crossed polarizers.
Figure 5B:
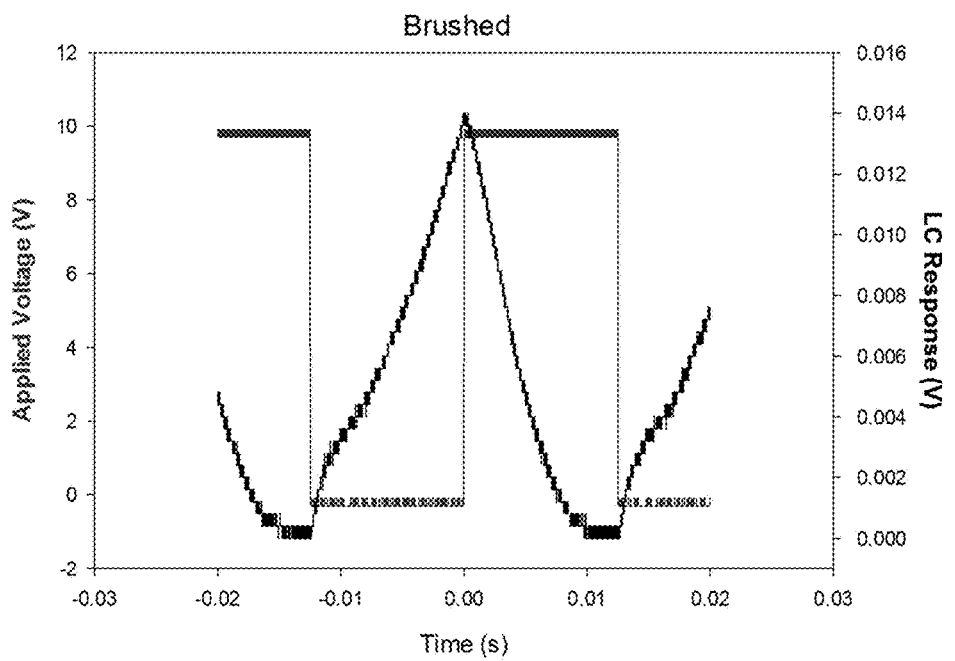
FIG. 5B is a plot of the voltage response of the same sample to a 40 Hz square wave.
Figure 6A:
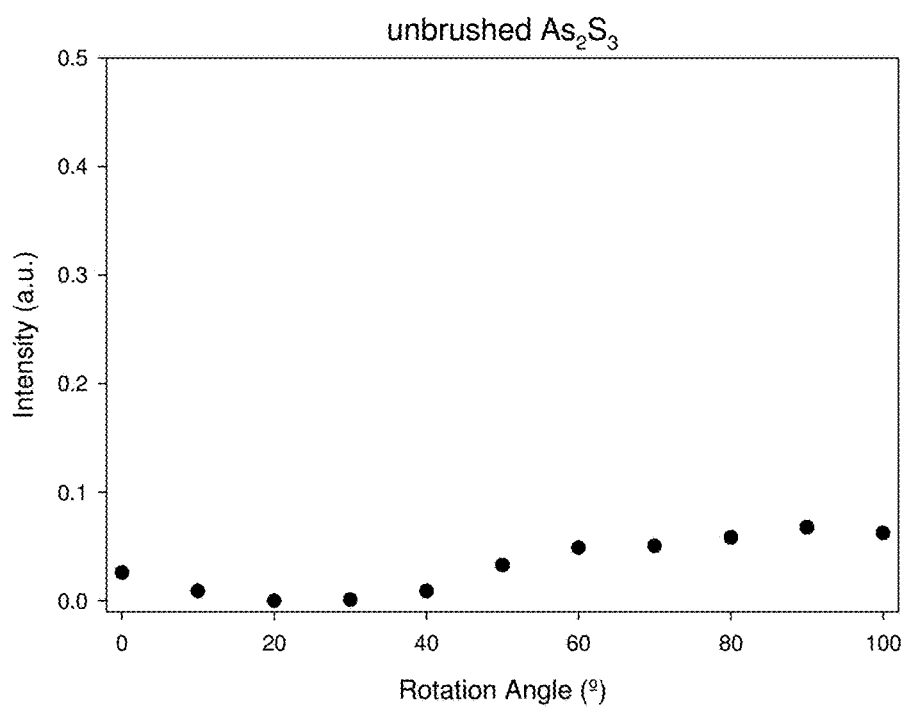
FIG. 6A is a plot of intensity change with respect to angle as a sample of LC on unbrushed $As_2S_3$ is rotated with respect to crossed polarizers.
Figure 6B:
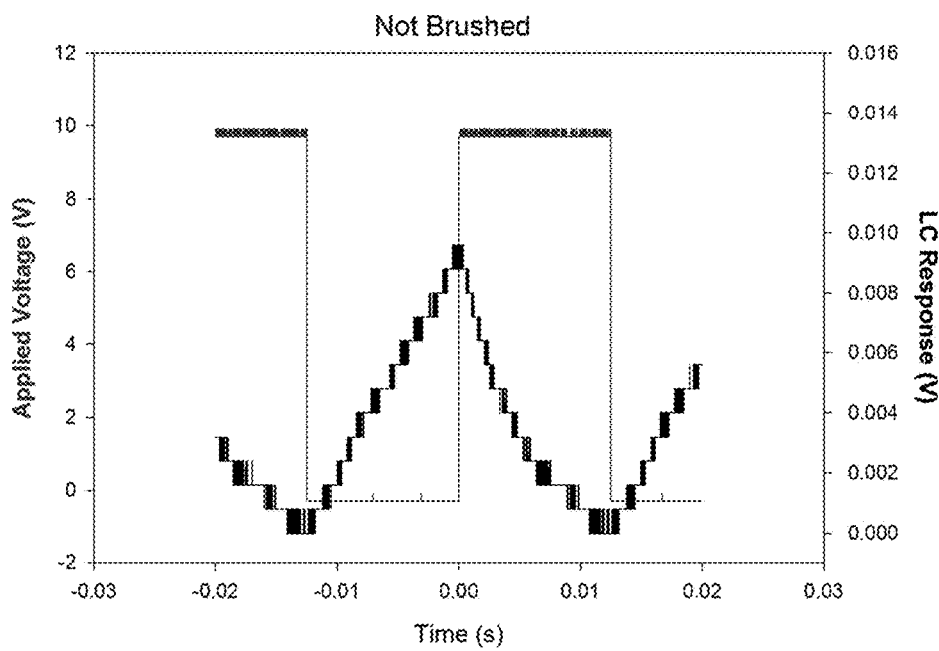
FIG. 6B is a plot of the voltage response of the same sample to a 40 Hz square wave.

Operation of the above embodiment was tested in a prototype, as illustrated in FIG. 3. In this waveguide assembly 300, the substrate and superstrate were silicate glass, both electrodes were ITO, both ChG layers (the ChG waveguide and the thin ChG film) were $As_2S_3$ films, the spacers were 23 μm thick Mylar spacers, the LC was commercially available MDA-03-1350, and the ChG films were rubbed with a nylon brush seven times. This waveguide assembly was compared with another one that was identical except that the ChG layers were not rubbed. Wires 312 were connected to the electrodes, and a voltage was applied across them via a variable voltage power supply 313. FIG. 4 shows the brushed ChG layers imaged under 10× magnification through crossed polarizers. As the waveguide assembly was rotated, the brightness changed significantly indicating alignment of the LC layer. FIG. 5A shows intensity change with respect to angle as this waveguide assembly was rotated with respect to crossed polarizers, a clear indication of alignment consistent with the images shown in FIG. 3. FIG. 5B shows the voltage response of the same sample to a 40 Hz, 0-10V square wave, measured at a temperature of 50° C. FIG. 6A shows intensity change with respect to angle as the waveguide assembly with the unbrushed ChG films was rotated with respect to crossed polarizers, showing no significant change in intensity. FIG. 6B shows the voltage response of the unbrushed sample to a 40 Hz, 0-10V square wave, measured at a temperature of 50° C. In this case the LC response was approximately 30% lower than for the sample with the brushed ChG layers. Together, these results indicate that brushing the ChG layers leads to alignment of the LC and supports optical switching of the LC in response to an applied voltage.

Figure 7:
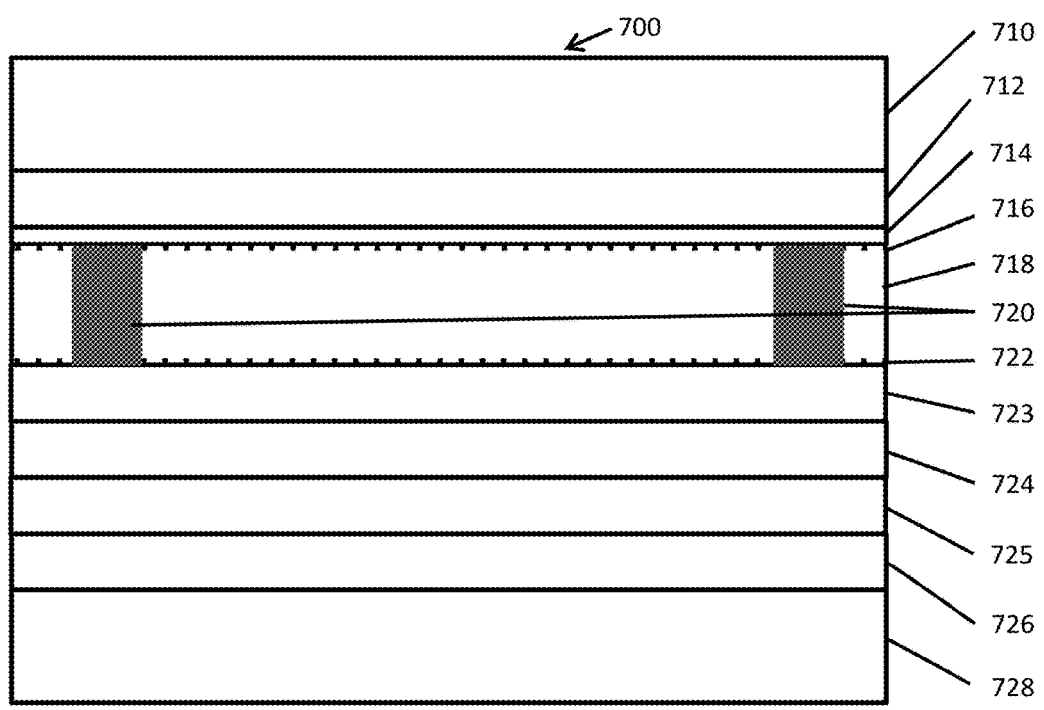
FIG. 7 is a schematic diagram of another embodiment of the waveguide assembly.

In another embodiment, shown in FIG. 7, the waveguide assembly 700 is made of a material that transmits in the wavelength range of interest. This material may be a ChG or some other suitable material. In addition to the substrate 728 and bottom electrode 726, this waveguide assembly may have a bottom cladding 725 with a lower refractive index in the wavelength range of interest than the waveguide. The bottom cladding 725 may be a ChG or some other suitable material that transmits in the wavelength range of interest. The waveguide has a top cladding 723 with a lower refractive index in the wavelength range of interest than the waveguide and is required to be a ChG. This ChG top cladding 723, rather than the waveguide, has a brushed surface 722 to provide an LC alignment layer. The waveguide assembly also comprises a supersubstrate 710, a top electrode 712, a thin ChG layer 714 with a brushed surface 716, an LC layer 718, and spacers 720.

Figure 8:
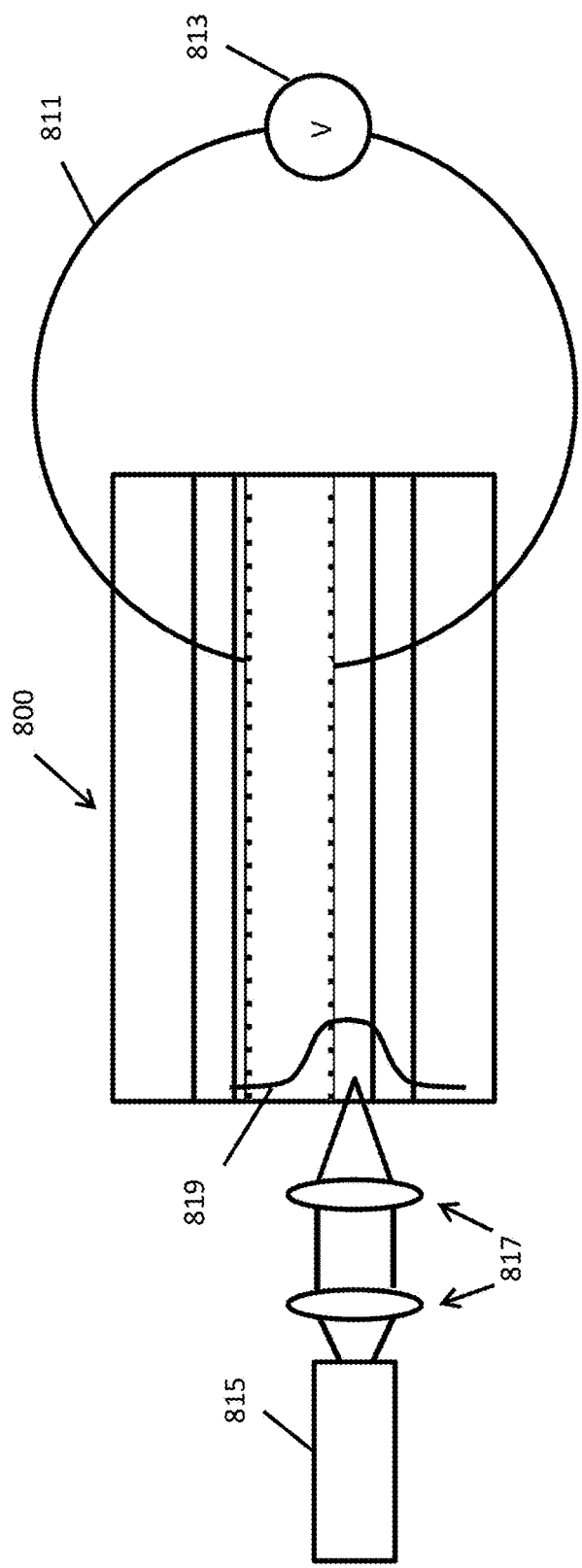
FIG. 8 is a schematic diagram of the waveguide assembly in operation with light coupled in via focusing optics and control of the mode shape achieved using a variable voltage supply.

In another embodiment, shown in FIG. 8, a voltage is applied across the electrodes through wires 811 via a variable voltage power supply 813 while light from a laser 815 is coupled into an edge of the waveguide assembly 800 using focusing optics 817. Light propagates through the waveguide in an optical mode 819 that has some overlap (nonzero power) in the region of the LC layer. By varying the supplied voltage, the refractive index of the LC and thus the effective index of the propagation mode may be changed.

Various alternatives are possible for the invention. The aligned LC layer may be used for applications other than optical waveguiding, including display, infrared scene generation, polarization gratings, and other electro-optic devices. The LC layer can consist of a single molecular component or mixture of molecules exhibiting an LC phase (nematic or higher order) over a temperature range compatible with the operating temperature of the ChG layers. The LC may possess a positive or negative dielectric anisotropy and a permanent molecular dipole to facilitate molecular switching in response to an applied voltage. The waveguide layer could be any chalcogenide glass—an amorphous material in which at least one of sulfur, selenium, or tellurium is a major constituent and is covalently bonded to network formers, such as As, Ge, Sb, Ga, or others. The waveguide layer could by an oxy-chalcogenide glass—an amorphous material in which oxygen and at least one of sulfur, selenium, or tellurium is a major constituent and is covalently bonded to network formers, such as As, Ge, Sb, Ga, or others. The waveguide assembly could be made without one or either electrode if the substrate were made of an electrically conductive material. The top alignment layer—the alignment layer proximate to the top electrode—could be formed in a material other than chalcogenide glass such as PI or another suitable material. Rather than a nylon brush, the ChG layers may be textured by rubbing with any suitable brush or cloth that produces surface texturing. Only one brushed surface may be used. In this case the ChG layer proximate to the bottom electrode is brushed, and no brushed top layer is present. The light beam may be coupled into the waveguide assembly via prism coupling rather than through the end face of the waveguide.

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," is not to be construed as limiting the element to the singular.

What is claimed as new and desired to be protected by Letters Patent of the United States is:

1. A method for achieving alignment and optical switching of a liquid crystal (LC) layer that it is deposited on chalcogenide glass (ChG), comprising:
    positioning a ChG waveguide between 0.1 and 10 μm thick on a bottom electrode, wherein the ChG waveguide is thick enough to support at least one optical mode;
    brushing the ChG waveguide;
    positioning a thin ChG film between 0.01 and 0.2 μm thick on a top electrode, wherein the thin ChG film is thin enough so that it does not support an optical mode;
    brushing the thin ChG film;
    positioning spacers to hold the thin ChG film at a fixed distance from the ChG waveguide; and
    filling the space between the thin ChG film and the ChG waveguide with an LC layer.

2. The method of claim 1, wherein the bottom electrode, the top electrode, or both comprise a transparent conductor.

3. The method of claim 1, wherein the bottom electrode, the top electrode, or both comprise indium tin oxide (ITO).

4. The method of claim 1, wherein the ChG waveguide is brushed in a configuration that is parallel to and opposite in direction for a brushing configuration of the thin ChG film.

5. A waveguide assembly for achieving alignment and optical switching of a liquid crystal (LC) layer that it is deposited on chalcogenide glass (ChG), comprising:
    a substrate;
    a bottom electrode deposited on the substrate;
    a ChG waveguide between 0.1 and 10 μm thick on the bottom electrode, wherein the ChG waveguide is thick enough to support at least one optical mode, and wherein the ChG waveguide has a brushed surface;
    a supersubstrate;
    a top electrode deposited on the supersubstrate;
    a thin ChG film between 0.01 and 0.2 μm thick on the top electrode, wherein the thin ChG film is thin enough so that it does not support an optical mode, and wherein the thin ChG film has a brushed surface;
    spacers to hold the thin ChG film at a fixed distance from the ChG waveguide; and
    an LC layer filling the space between the thin ChG film and the ChG waveguide.

6. The waveguide assembly of claim 5, wherein the bottom electrode, the top electrode, or both comprise a transparent conductor.

7. The waveguide assembly of claim 5, wherein the bottom electrode, the top electrode, or both comprise indium tin oxide (ITO).

8. The waveguide assembly of claim 5, wherein the ChG waveguide has a brushing configuration that is parallel to and opposite in direction for a brushing configuration of the thin ChG film.

9. The waveguide assembly of claim 5, wherein all materials are mid-wave infrared (MWIR) compatible.

* * * * *